July 7, 1970   P. F. M. GAMBS   3,519,337
INTERNAL READING MEANS, CHIEFLY FOR OPHTHALMOMETERS
Filed Oct. 19, 1965   3 Sheets-Sheet 1
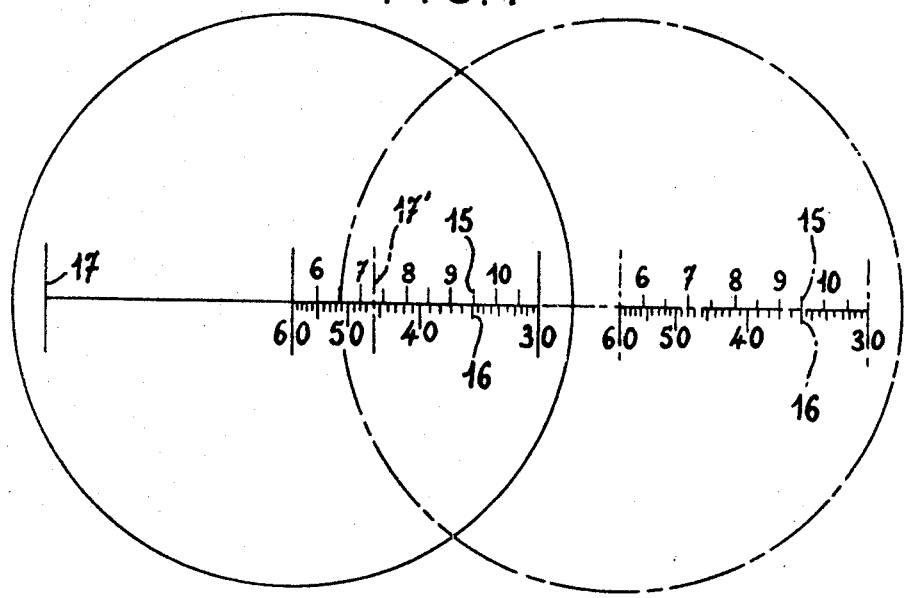
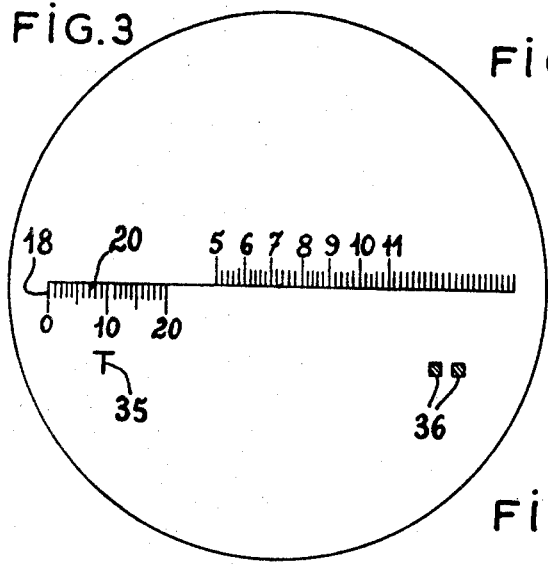
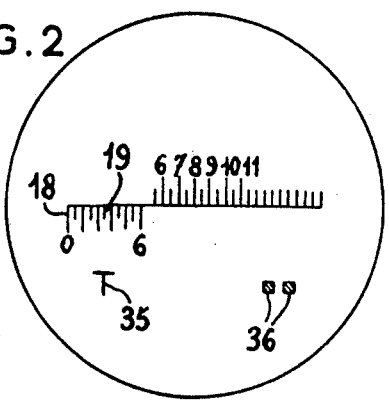
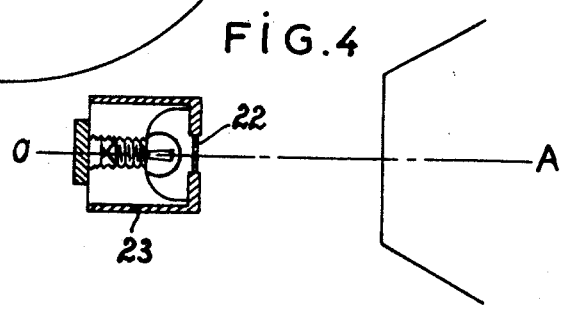
INVENTOR
PAUL FREDERIC MARIE GAMBS
BY
ATTORNEYS

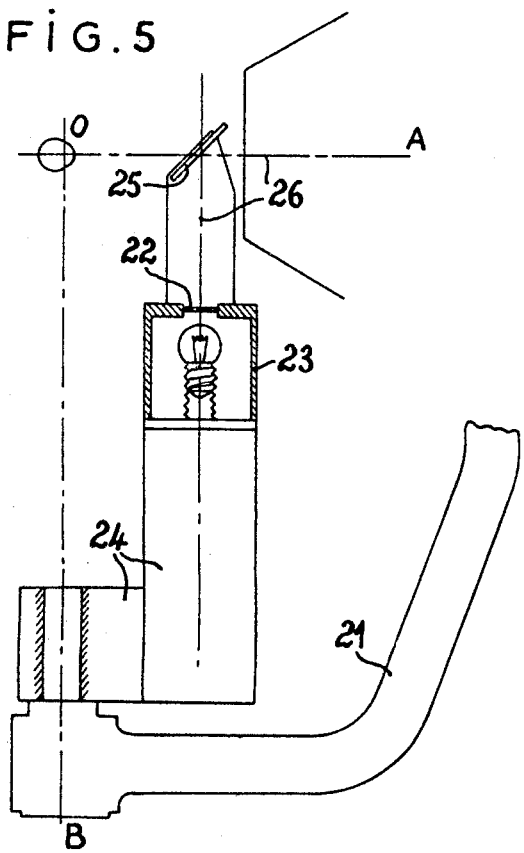

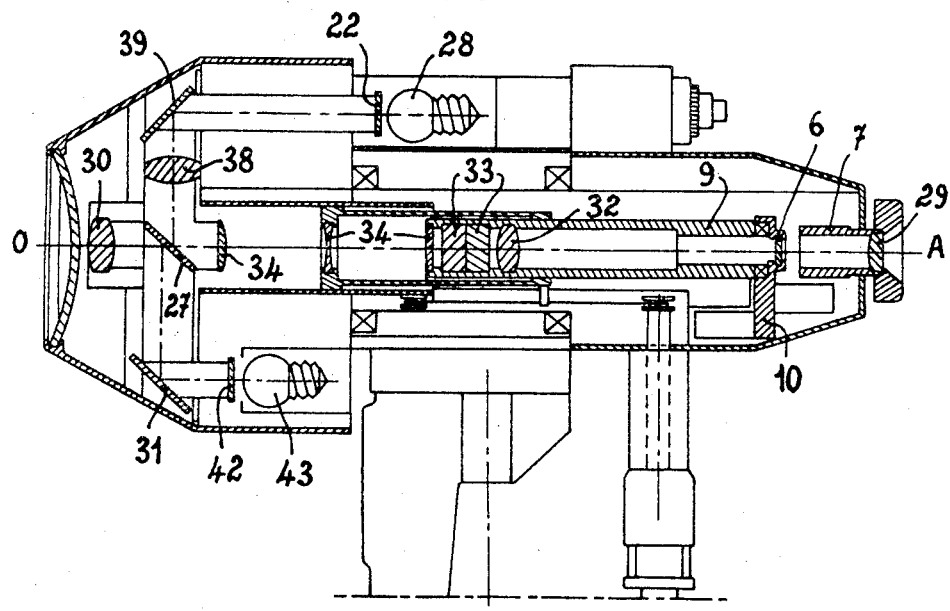

United States Patent Office 3,519,337
Patented July 7, 1970

3,519,337
INTERNAL READING MEANS, CHIEFLY FOR OPHTHALMOMETERS
Paul Frédéric Marie Gambs, 16 Rue Barreme, 69, Lyon 6°, France
Filed Oct. 19, 1965, Ser. No. 497,782
Claims priority, application France, Apr. 30, 1965, 45,938; July 8, 1965, 46,203
Int. Cl. A61b 3/10, 3/00
U.S. Cl. 351—6                    1 Claim

ABSTRACT OF THE DISCLOSURE

An ophthalmometer provided with fixed sighting marks reflected from the cornea of the patient's eye and variable duplication of the observed images is provided with a fixed reading device comprising a reference mark and a scale, both stationary. Means are provided for making this reading device visible in the field of vision, with the same duplication as the images of the sighting marks reflected from the cornea of the patient's eye.

---

In certain optical apparatus such as ophthalmometers, in particular, the eye pieces should satisfy the following conditions:

The plane of the intermediate image should be defined accurately because the distance between said plane and other parts of the apparatus has a large effect on the adjustment of the apparatus. This is the case for instance in the gauging of measurements with Javel ophthalmometers.

When the apparatus is adapted to rotate about its optical axis, as for instance in the case of ophthalmometers, the angular position of a meridian plane of said apparatus, that is the plane of the sighting marks, is defined in the same apparatus with reference to a stationary meridian plane which may be a horizontal plane. It is of advantage in such a case for this angular setting to be read directly through the eyepiece.

In ophthalmometers provided with stationary sighting marks, the coincidence between the images of the sighting marks observed after reflection by the cornea which is being examined, is obtained through a modification in the duplication applied to the field of observation.

In all known apparatus, the measurement of the radius of curvature of the cornea relies on the mechanical transmission of movement between the scale or the reference mark and the optical elements such as plates with parallel surfaces, prisms, lenses, mirrors and the like which ensure a modification in the duplication as disclosed for instance in my British Pat. 893,990 dated June 23, 1959 and entitled "Ophthalmometers."

The construction of such a mechanism is a delicate matter and leads to a high cost price for the instrument.

My present invention has for its object an internal reading system which eliminates all such drawbacks.

According to my invention, the reading is performed directly through the optical system of the actual instrument on a stationary scale associated with a reference mark of which the duplicated image provided by the optical system of the instrument appears in superposition over a predetermined point on the scale.

The accompanying diagrammatic drawings illustrate, by way of example and in a non-limiting sense, various embodiments of my invention. In said drawings:

FIG. 1 shows a scale for internal reading drawn as a function of the angle formed by sighting marks, said scale being rigid with an index or reference mark.

FIG. 2 illustrates a scale defining the radii of curvature of the cornea, the scale being subdivided into half millimeters and associated with a vernier, which allows reading fractions down to 1/20 of a mm., said scale also carrying reference marks allowing its possible use for tonometric purposes.

FIG. 3 illustrates a scale similar to that of FIG. 2, except for the fact that, the scale carrying subdivisions equal to 1/5 of a mm., the vernier allows reading down to 1/100 of a mm., said scale also carrying reference marks allowing its possible use for tonometric purposes.

FIGS. 4 and 5 illustrate means for inserting the scale across the optical path of the instrument.

FIG. 6 is an elevational view, partly sectional along a longitudinal plane, of an ophthalmometer provided with either of the scales illustrated in FIGS. 1 to 3.

Suitable optical and/or mechanical means of a known type are resorted to for inserting a scale and a reference mark (FIGS. 1 to 3) in front of the main optical system of the ophthalmometer.

The scale system illustrated in FIG. 1 includes an upper scale 15 indicating in millimeters the radius of curvature of the cornea and a lower scale 16 carrying subdivisions indicating the dioptres, that is the optical power, said scales being associated with a reference mark 17.

The scale system illustrated in FIGS. 1 to 3 appears therefore to the operator, with the duplication provided by the actual instrument.

It is sufficient, for it to be suitably drawn, for one image 17' through one optical path of the reference mark 17 to be superposed over a subdivision of the image through the other optical path of the scale 15, which subdivision indicates the value of the radius of curvature of the cornea which is being measured. In other words, let it be assumed that the phantom-like image of FIG. 1 is a first image and the full-line image of FIG. 1 is a second image, each of said first and second images having a reference mark 17 and a graduated measuring scale 15 or 16 whose distance from the reference mark 17 remains constant. In addition, there are two sighting marks whose images are brought into coincidence on the cornea of a patient's eye, according to the technique well known in the prior art. When this happens, then the two images shown in FIG. 1 are moved relative to each other so that the reference mark 17' of the first or phantom-line image of FIG. 1 overlies the graduated measuring scale 15 or 16 of the second or full-line image of FIG. 1, at a position that gives a reading of a corneal measurement. This movement of the first and second images of FIG. 1 relative to each other is responsive to the bringing into coincidence of the images of the sighting marks on the cornea of a patient's eye and is accordingly not subject to inadvertent displacement by virtue of movement of the patient's eye, so that the reading indicated in FIG. 1 will remain indefinitely and can be read at the operator's convenience.

In order to increase accuracy in reading, the reference mark 18 (FIGS. 2 and 3) may be associated with a vernier 19 or 20 similar to that provided on calipers.

Preferably, said scale appears in the field of the eyepiece only at the moment at which the operator requires seeing it and it can be caused to vanish as desired, in particular while the operator is sighting the cornea of the patient and provides coincidence between the images of the sighting marks which have been observed after reflection by the cornea, so as not to disturb said operation which is a somewhat delicate one.

Various embodiments of my invention are disclosed hereinafter:

First example (FIG. 4): in order to provide a reading system which is completely independent of the ophthalmometer, it is possible to recure the support 22 of the scale to the front surface of the illuminating box 23 to be secured to an upright carrying the head-rest of the opthalmometer. After producing coincidence between the images of the sighting marks by sighting the patient's cornea, the operator sights the scale. However, he should first rotate the ophthalmometer about its main optical axis OA, so as to bring the duplication plane of the instrument along the axis of the scale.

Second example (FIG. 5): the support 22 for the scale which is suitably illuminated can also be secured to a further support 24 with the possibility for it to pivot or to slide so as to bring the scale into its reading position with or without the interposition of a reflecting surface 25 adapted to deflect the optical path 26.

In FIG. 5, the support 24 can revolve about the vertical axis OB which intersects the axis OA of the ophthalmometer. Said embodiment allows collapsing as required the reading system out of the observation field, by bringing the duplication plane into parallelism with the axis of the scale through rotation about the main optical axis OA.

In this case, as also in the following case, the scale may also be located in a manner such that a partly reflecting arrangement 25 such as a Lummer cube or a sloped glass plate returns continuously the image of the scale into the optical system, which image appears clearly only when a switch is caused to control the means illuminating the scale through the illuminating box 23.

In the present invention, neither the scale nor the reference mark is reflected from the cornea. The marks reflected from the cornea are sighting marks which are brought into coincidence through variable duplication. Then, the reference mark and the measuring scale are made visible by illumination of the light 28. It is accordingly a simple matter to locate the position of the duplicated reference mark on the fixed scale, as neither the reference mark nor the scale can be blurred or indistinct or moving.

In the embodiment of an ophthalmometer illustrated in FIG. 6, said internal reading system is incorporated with the part rotating about the horizontal axis OA and the reading is then performed in any angular direction about said axis OA.

The support 22 of the scale illuminated by the bulb 28 may then be arranged in a manner such that a partly reflecting device 27, such as a Lummer cube or a sloped glass plate, reflects continuously its image into the main optical system of the instrument.

The operator can see through the eye-piece 29 and the optical system 32 to 34 of the ophthalmometer the image of the scale at 22 reflected by the mirror 39 and transmitted through the objective 38 and the plate 27.

In an auxiliary manner, the semi-reflecting device constituted by the plate 27 may serve for directing into the patient's eye through the objective 30 the light reflected by the mirror 31 and produced by the graticule 42 illuminated by the bulb 43. Said graticule is provided with a central point to be fixed by the patient's eye and possibly sighting marks arranged in the manner described in my copending application entitled "Topographic ophthalmometers" Ser. No. 494,447, filed Oct. 11, 1965 now abandoned.

In the embodiments illustrated in FIGS. 4 and 5, it is necessary for reading purposes to set the ophthalmometer in a manner such that the duplication may be performed along the axis of the scale.

In the case illustrated in FIG. 6, this necessity of accurately setting the ophthalmometer is eliminated.

When used for tonometric purposes, the scale may also carry reference marks 35 and 36 which are caused to coincide by positioning the vertical line forming the reference mark 35 which assumes the shape of a T between two rectangular marks 36 as illustrated in FIGS. 2 and 3. For ophthalmometric measurement, the sighting marks reflected from the cornea are observed through the instrument, the duplication of which is adjusted to bring them into overlapping relation. Then, the measuring scale is made visible in the instrument, and the same duplication brings the reference mark into overlapping relation with the measuring scale, so that the measured value can be read on the stationary scale. For aplanation tonometry on a fixed surface, the reverse procedure is followed: the reading scale is first observed; and then by effectuating the overlap, the reading is brought to the tonometric value (duplication of 3.06 mm.); then applanation of the cornea is effected with incident pressure measured dynamometrically while observing through the apparatus the circle of aplanation whose diameter corresponds to the duplication which manifests itself as two tangential circles. The intraoccular pressure is then read on the dynamometer.

What I claim is:

1. In an ophthalmometer having an optical system having a fixed line of sight and adjustable duplicating means to bring into coincidence the images of sighting marks on the cornea of a patient's eye; the improvement comprising means for providing non-corneal-reflected scale and reference mark means for direct reading corresponding to the corneal curvature, means for establishing in the field of vision of the ophthalmometer a first image of a reference mark and of a graduated measuring scale whose distance from each other remains fixed, means for establishing in said field of vision a second image which is a duplicate of but is displaced from and partially overlaps said first image, and means for moving said first and second images relative to each other upon adjustment of said duplicating means so that when the images of said sighting marks are brought into coincidence said reference mark of said first image will overlie said scale of said second image at a position to give a corneal measurement and means for introducing said scale and reference mark means at the moment when the operator requires it.

References Cited

UNITED STATES PATENTS

| 753,940 | 3/1904 | Walker. | |
| 1,116,529 | 11/1914 | Allen | 351—6 |
| 1,918,540 | 7/1933 | Hartinger | 351—13 |
| 2,110,330 | 3/1938 | Freeman | 351—12 |
| 1,162,058 | 11/1915 | Henker | 351—10 |

FOREIGN PATENTS

| 911,754 | 11/1962 | Great Britain. |
| 142,056 | 3/1961 | Russia. |

DAVID SCHONBERG, Primary Examiner

PAUL A. SACHER, Assistant Examiner

U.S. Cl. X.R.

351—16